United States Patent
Petralia

(10) Patent No.: US 7,676,410 B2
(45) Date of Patent: Mar. 9, 2010

(54) COMBINED DEBT CONSOLIDATION AND SETTLEMENT PROGRAM

(75) Inventor: Kathryn Petralia, Atlanta, GA (US)

(73) Assignee: CompuCredit Intellectual Property Holdings, Corp. II, Las Vegas, NV (US)

( * ) Notice: Subject to any disclaimer, the term of this patent is extended or adjusted under 35 U.S.C. 154(b) by 545 days.

(21) Appl. No.: 11/433,726

(22) Filed: May 12, 2006

(65) Prior Publication Data

US 2007/0265958 A1 Nov. 15, 2007

(51) Int. Cl.
*G06Q 40/00* (2006.01)

(52) U.S. Cl. .......................... 705/35; 705/36

(58) Field of Classification Search ............... 705/35–36
See application file for complete search history.

(56) References Cited

U.S. PATENT DOCUMENTS

2006/0080236 A1 * 4/2006 Welker et al. ................. 705/40

* cited by examiner

*Primary Examiner*—Thu Thao Havan
(74) *Attorney, Agent, or Firm*—Sentry Law Group

(57) ABSTRACT

A customer is assisted in recovering from indebtedness by combining a debt consolidation/settlement program with an installment loan. The customer is qualified for an installment loan with a value based on the amount of outstanding indebtedness or possibly based on the anticipated discounted balance. The customer is required to make payments into an escrow account for a period of time to ensure that the customer is credit worthy. One or more of the creditors are then approached in an effort to negotiate a discounted settlement amount in exchange for the reception of immediate reconciliation of the debt owed. A portion of the negotiated discount is retained for compensation, which can be provided to the debt settlement provider and/or the bank finding the installment loan. The balance is passed through to the customer.

20 Claims, 2 Drawing Sheets

COMBINED DEBT CONSOLIDATION AND SETTLEMENT PROGRAM

BACKGROUND OF THE INVENTION

Credit can be one of life's greatest inventions. Everyone can benefit. Credit enables a farmer to purchase a new tractor from the local tractor store, so that he can work his fields to produce a crop that can be sold to consumers, and the proceeds from the sell can then be used to pay off the creditor. The tractor store gets a sell, the farmer gets a tractor, the consumers get a fresh crop and the creditors get a little compensation for being the enabler of the entire cycle. Without the credit, there would be no tractor sell and no crop for the consumers.

However, sometimes things just go wrong and credit can become a nightmare. It may have been a bad year for the farmer to plant the particular crop, there may have been a lack of rain, a surplus of rain, a late frost, etc. In this example, as well as in numerous other examples, good people with good intentions may find themselves in quite a credit predicament.

The financial industry has responded to this predicament in the consumer market by providing various services to help consumers get out of, or recover from, various credit predicaments in which they may find themselves. Some of the services available to help credit-trouble consumers include credit counseling, debt management services and debt settlement programs.

Credit counseling is a service that provides information programs and training to consumers to assist in the recovery from financial stress. Credit counseling centers help consumers to access their financial situation, develop a recovery, payment and spending plan, set financial goals and create an action plan for attaining such goals. Such centers can provide other services such as educational programs regarding budgeting or the like. Some credit counseling centers, as well as other companies, provide debt management services.

Debt management services typically focus on consolidating a consumer's debts and working with the consumer's creditors to setup a timeline for paying off of the debts. For instance, a typical debt management service includes identifying all of a customer's debt, negotiating with the credit companies to reduce the payments by lowering the interest rate, waiving late fees, etc., and then consolidating or rolling all of the customer's payments into a single, lower monthly payment that is provided to the debt management service provider. In general, debt management programs result in paying off 100% of the outstanding balance, requires the customer to close out all credit cards, and have an adverse impact on the customer's credit score. Debt management service companies are typically compensated by obtaining a fair share, or a percentage, of the amount collected on behalf of the creditor. Typical compensation for such services is in the range of 8% of the collected amount.

Another service provided to consumers is debt settlement. Debt settlement differs from debt management in that the service provider actually negotiates a debt reduction or a discount on the value of the dollars that are owed by the consumer. In general, in a debt settlement service, an attorney representing the debtor contacts the various creditors of the debtor. The attorney and the creditors settle on an amount owed which basically includes a discount on the dollars (i.e., paying fifty cents on the dollar). At the onset of providing debt settlement services, the consumer is typically instructed to stop making payments to his or her creditors but rather, to make payment into an escrow or prepaid debit account. Once the value of the account builds up to an amount likely to satisfy the creditor, the consumer's attorney offers immediate payment and reconciliation of the debt at a discounted rate. Because the customer is not paying their creditors, and average balances on all accounts are in the $15,000 to $20,000 range, customers often become greater than 180 days delinquent and are charged off by their creditors before settlement occurs. The typical fee to the consumer is 15-20% of the discount received by the consumer on their total debt. Similar to the debt management service, debt settlement service can disadvantageously have an adverse effect on a consumer's credit rating and generally require the consumer to cancel their current credit cards and/or accounts.

What is needed in the art is a method or service to help consumers recover from credit problems in a manner that does not impact their credit rating as significantly and that still allows them to have some access to credit.

BRIEF SUMMARY OF THE INVENTION

Various embodiments and aspects of the present invention provide a method to assist a customer in recovering from indebtedness that has accrued against one or more creditors. The customer can either be identified through solicitation, advertising or through contacting the various creditors. Once a customer is identified, the customer is enrolled into a debt settlement program. The debt settlement program can be managed by a third party or can be offered by the service provider entity providing the debt consolidation program to the customer. The customer is instructed to stop making payments to the various creditors and instead, is instructed to make payments into an escrow account that is owned by the customer but operated or managed by either the third party or the service provider. The customer is qualified for an installment loan that in general is based on the value of the outstanding debt. For instance, the value of the installment loan can be based on the entire outstanding debt, or value determined by an expected amount of discounts that are to be negotiated for the outstanding debt. The monthly payment for the customer is based on the amount of the installment loan and preferably is less than the aggregate amount of the customer's current monthly payment amounts.

In one embodiment, the customer is required to make monthly payments to the escrow account for either a period of time or until a minimum balance is obtained. In other embodiments, this requirement may be waived. In either case, one or more of the creditors are approached, either by the service provider or the third party in effort to obtain a discounted settlement for the outstanding debt owed to that creditor. The discount may be based on several factors including, but not limited to obtaining a reduced interest rate on the outstanding balance, a waiver or reduction in late fees and/or a discount on the balance of the debt. Once the settlement is negotiated, at least a portion of the amount of the installment loan is offered in settlement of an outstanding debt. A portion of the negotiated discount can be passed on to the customer while a portion is retained by the service provider and/or the third party in compensation for assuming the risk of the debt.

In some embodiments of the invention, the customer may also be provided with a credit card instrument with a line of credit to enable the customer to conduct further credit transactions.

DETAILED DESCRIPTION OF THE INVENTION

The present invention is directed towards a debt consolidation and settlement method, program and/or service which enable a consumer to recover from credit problems while maintaining a good credit rating for the customer and still giving the customer access to additional credit.

Now turning to the figures in which like labels refer to like elements throughout the several views, detailed operation of various aspects, features and embodiments of the present invention are presented.

Figure 1:
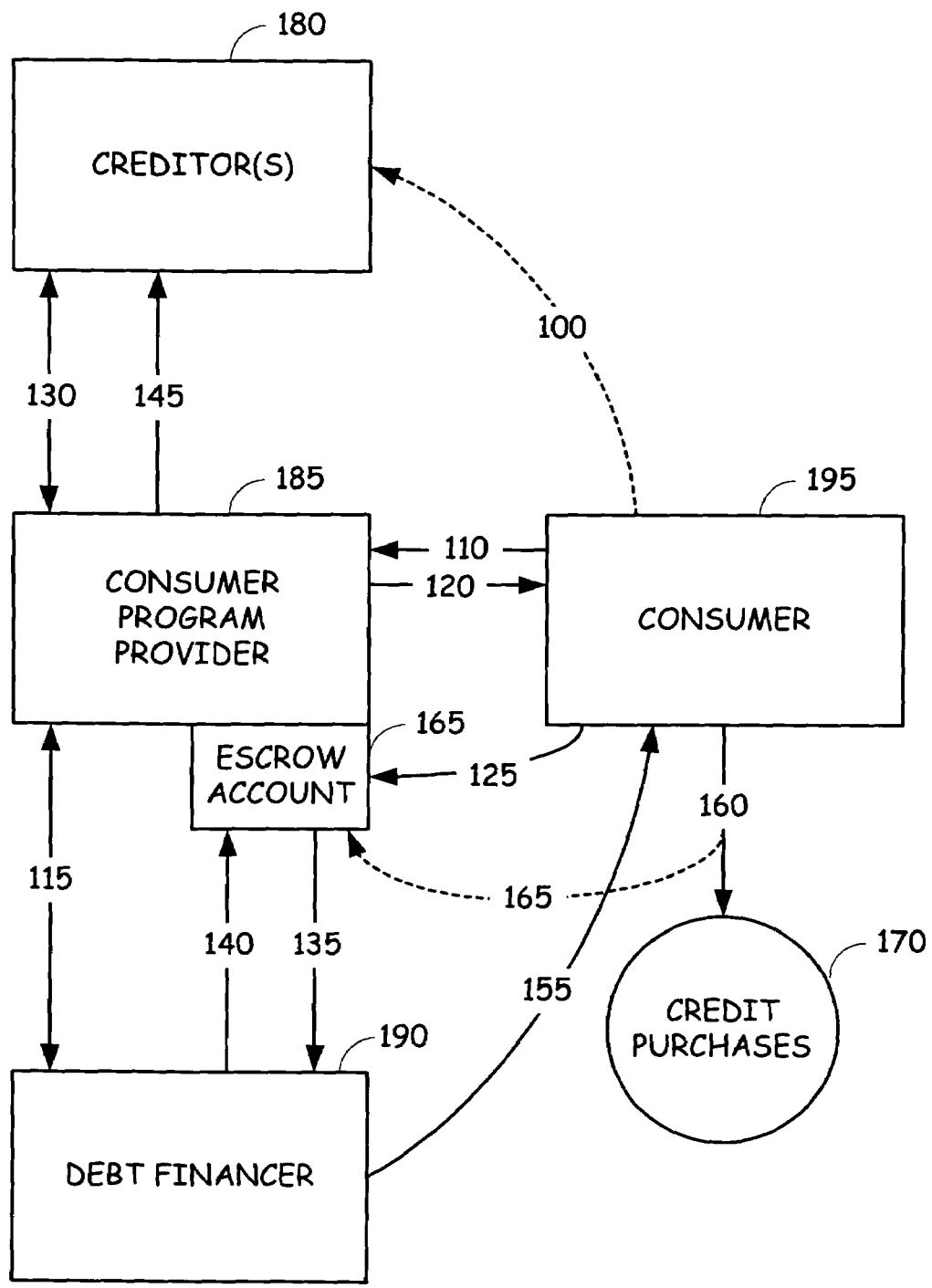
FIG. 1 is a conceptual block diagram illustrating the parties involved, the relationships between the parties and the activities of the various parties in one embodiment of the present invention.

FIG. 1 is a conceptual block diagram illustrating the parties involved, the relationships between the parties and the activities of the various parties in one embodiment of the present invention. The parties involved in an exemplary embodiment of the present invention include one or more creditors 180, a consumer program provider such as a debt consolidation or settlement program provider 185, a financer 190 and a consumer 195. At the onset, a consumer 195 has accrued a certain amount of debt owed to the one or more creditors 180 as illustrated by hashed line 100.

An exemplary embodiment of the combined debt consolidation/settlement program can be provided by a single entity or a combination of two or more entities. In the illustrated embodiment, the consumer program provider 185 and the financer 190 are shown as two separate entities. In operation, the consumer 195 may approach the consumer program provider 185 to participate in the debt consolidation/settlement program of the present invention. Alternatively, the consumer can directly approach the financer 190 or, the financer 195 and/or consumer program provider 185 may directly approach the consumer 195 either through solicitation or at the request of the one or more creditors 180. In the illustrated embodiment, the consumer 195 is shown as directly approaching 110 the consumer program provider 185.

The consumer program provider 185 and the financer 190 jointly cooperate to provide the debt consolidation/settlement program of the present invention. As previously mentioned, it should be understood that the consumer 195 may directly approach the financer 190, which in turn contacts the consumer program provider 185 for establishing the debt consolidation/settlement program of the present invention.

In the illustrated embodiment, the consumer program provider 185 operates as is typical in the current state of the art to either set up a debt payment plan or a debt consolidation plan for the consumer 195. However, the financer 190 provides an installment loan to fund the consumer program provider 185 on behalf of the consumer 195. From the perspective of the consumer 195, the implementation of the program can be essential transparent as will be further described.

The consumer 195 must be enrolled and accepted into the inventive program. Several criteria can be applied in the process including conducting credit checks, personal interviews, analysis of assets, etc. A typical consumer 195 suitable for enrollment in the inventive program is one that is 2-3 months in arrears of making credit payments to the creditors.

Once the consumer 195 is accepted 120, the financer 190 establishes an installment loan and the consumer program provider 185 and/or the financer 190 establish an escrow account 165 on behalf of the consumer 195. It should also be appreciated that in other embodiments, the actual installment account may not be established until the consumer has met the settlement criteria—either a specific number of payments or a dollar amount paid in to the escrow account by the consumer. A monthly payment 125 is established for the consumer 195 and the consumer begins making these payments which accrue into the escrow account 165.

Around the same time or shortly after the escrow account 165 begins to accrue funds, the consumer program provider 185 approaches 130 the creditor(s) 180 to begin negotiation of the terms of settling the debts. Because the consumer 195 is already in arrears on payments to the creditors, the inventive program operates to attempt to prevent a bad credit report being issued by the creditor(s) 180 against the consumer 195. Thus, the inventive program operates to balance the accrual of adequate funds into the escrow account 165 to mitigate the payment risks imposed on the consumer program provider 185 and the financer 190 with the risk of having an adverse credit report issue against the consumer 195 from the creditor(s) 180. This balance can be achieved either through monitoring the creditor(s) or simply based on known knowledge regarding the operations of the various creditor(s). In addition, a minimum accrual balance 135 in the escrow fund 165 may be required prior to approaching the creditor(s) 180. Thus, the installment loan 140 provided by the financer 190 can be contingent upon a certain amount of payments being made from the consumer 195. In the preferred embodiment, the terms of settlement will include a discount on the amount of debt owed to the creditor(s) in exchange for immediate reconciliation; however, it should be understood that aspects of the present invention are also applicable to a simple payment plan that may or may not include a waiver of late fees, penalties and reduced interest rates.

Once a settlement agreement has been reached, the accrued funds in the escrow account 165, supplemented by the installment loan 140 obtained from the financer 195 is used as payment 145 in settlement to the creditor(s) 180. The consumer 195 continues to make the monthly payments 125 except now the payments are applied against the installment loan, potentially reduced by the accrued amount in the escrow account 165. The discount in the debt that is negotiated between the creditor(s) 180 and the consumer program provider 185 and/or the financer 190 is allocated between the consumer program provider 185 and the financer 190. Advantageously, this aspect of the present invention enables the creditor(s) 180 to receive a timely reconciliation of the consumer's 195 debt, establishes a reasonable and reduced payment program for the consumer 195 and mitigates the risk of any, or further bad credit reports against the consumer 195. The compensation for assuming the risk and for assisting the consumer 195 and the creditor 180 in the settlement of this debt is realized by the consumer program provider 185 and/or the financer 190 out of the negotiated reduction or discount in the debt. However, it should be understood that in a straight debt settlement program embodiment of the invention in which the actual debt is not reduced, the amount of the installment loan may be increased to provide such compensation.

Another aspect of the present invention is that the financer 190, which can gain significant knowledge about the reliability, responsibility and trustworthiness of the consumer 195 through the implementation of this inventive program, can also offer a credit account 155 to the consumer 195 even while the payoff of the debt is in effect. In operation, the debt financer 190 can establish a credit line for the consumer 195 and issue a credit card to the consumer 195. The consumer can utilize this credit card in further financial transactions 160 and the amount charged against the card 165 can either be separately billed to the customer in one embodiment, or included in the balance of the installment loan 140 in another embodiment. Thus, advantageously, this aspect of the present invention provides the consumer 195 with access to a certain amount of credit while the debt consolidation/settlement program is operating to payoff the consumer's 195 outstanding debt.

Figure 2:
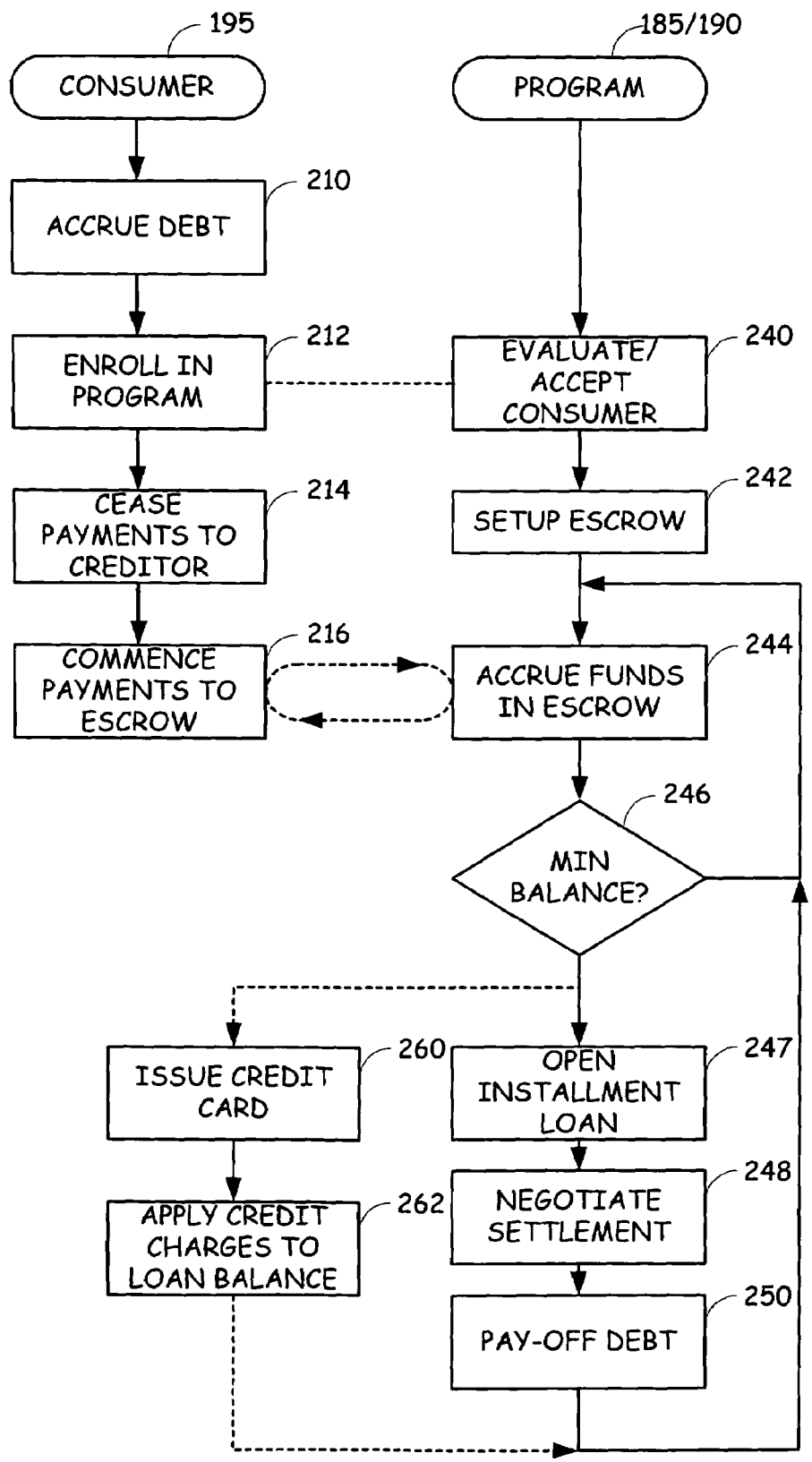
FIG. 2 is a flow diagram illustrating the steps involved in providing an embodiment of the present invention.

FIG. 2 is a flow diagram illustrating the steps involved in providing an embodiment of the present invention. In general, the process includes two flows, one flow includes consumer 195 based actions and the other flow includes program 185/190 based actions. An ideal consumer candidate for the present invention is one that is several month arrears in his or her payments to creditors 210; however, it will be appreciated that the present invention can be applied to consumers that are not behind on any payments but rather are just desirous of eliminating their debt or can be applied for consumers on the verge of bankruptcy. The consumer 195 enrolls in the program 212 through a consumer program provider 185 or debt finance 190 which evaluates 240 the consumer 195 for acceptance into the program. Once accepted in the program, an escrow account 165 is setup for the consumer 195 at step 242 and the consumer 195 is instructed to stop making payments to the creditor(s) 214 and to start making an established monthly payment into the escrow account 216.

As the payments are received from the consumer 195, the escrow account begins to accrue the funds 244. If the escrow account 165 reaches a minimum balance 246, the program continues by opening an installment loan 247 on behalf of the consumer 195 and then continues by negotiating a settlement 248 of the consumer's 195 debt with the creditor(s) 180. It should also be appreciated that this process can be reversed by first opening the installment loan 247 and then receiving payments and accruing the same. Once a settlement is reached, the program operates to pay-off the debt 250 with the creditor(s) 180 using funds from the installment loan and the accrued escrow balance. The continued payments from the consumer 195 are applied against the balance of the installment loan.

In addition, the program can operate to open a credit account 160 for the consumer 195 by issuing a credit card 260 and establishing a credit limit. When charges are made using the card, the charges are applied to the current loan balance 262. Thus, while the consumer 195 is in the process of recovering from being in debt, the consumer 195 can still have access to credit if necessary.

Thus, various embodiments and aspects of the present invention provide a method to assist a customer in recovering from indebtedness that has accrued against one or more creditors. The customer can either be identified through a variety of means, including solicitation, advertising, by referral from a debt settlement agency,r through contacting the various creditors or otherwise. Once a customer is identified, the customer is enrolled into a debt settlement program. The debt settlement program can be managed by a third party or can be offered by the service provider entity providing the debt consolidation program to the customer. The customer is instructed to stop making payments to the various creditors and instead, is instructed to make payments into an escrow account that is owned by the customer but operated or managed by either the third party or the service provider. The customer is qualified for an installment loan that in general is based on the value of the outstanding debt. For instance, the value of the installment loan can be based on the entire outstanding debt, or value determined by an expected amount of discounts that are to be negotiated for the outstanding debt. The monthly payment for the customer is based on the amount of the installment loan and preferably is less than the aggregate amount of the customer's current monthly payment amounts.

In one embodiment, the customer is required to make monthly payments to the escrow account for either a period of time or until a minimum balance is obtained. In other embodiments, this requirement may be waived. In either case, one or more of the creditors are approached, either by the service provider or the third party in effort to obtain a discounted settlement for the outstanding debt owed to that creditor. The discount may be based on several factors including, but not limited to obtaining a reduced interest rate on the outstanding balance, a waiver or reduction in late fees and/or a discount on the balance of the debt. Once the settlement is negotiated, at least a portion of the amount of the installment loan is offered in settlement of an outstanding debt. A portion of the negotiated discount can be passed on to the customer while a portion is retained by the service provider and/or the third party in compensation for assuming the risk of the debt.

In some embodiments of the invention, the customer may also be provided with a credit card instrument with a line of credit to enable the customer to conduct further credit transactions.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for providing a debt consolidation financial service offered by a program provider, the service comprising the steps of:

enrolling a customer into a debt settlement program, the customer having an outstanding debt owed to one or more creditors and the debt settlement program being provided by a program provider that is not affiliated with the one or more creditors;

qualifying the customer for a debt consolidation loan being provided by a financing entity that is not affiliated with the one or more creditors, the debt consolidation loan being contingent upon the customer making at least one payment into an escrow account associated with the debt consolidation loan;

electronically creating the escrow account;

receiving at least one payment from the customer into the escrow account;

negotiating with the one or more creditors a discounted amount due for at least a portion of the outstanding debt owed;

applying at least a portion of the funds from the debt consolidation loan as settlement to the one or more creditors for the discounted amount due; and allocating a portion of the difference between the at least a portion of the outstanding debt and the discounted amount due to at least one of the financing entity and the program provider.

2. The method of claim 1, wherein the step of qualifying the customer for a debt consolidation loan further comprises the steps of:
   establishing a monthly payment for the customer to be made in lieu of payments to the one or more creditors for the outstanding debt; and
   requiring monthly payments from the customer for an initial period of time.

3. The method of claim 1, wherein prior to the step of negotiating a discounted amount due, the method comprises the step of:
   contacting the creditor prior to the creditor issuing a bad credit report against the customer.

4. The method of claim 1, further comprising the step of:
   limiting the impact on the customer's credit rating by initiating the negotiation of the discounted amount due with the creditor just prior to the creditor writing off the debt.

5. The method of claim 4, further comprising the steps of:
   establishing a credit limit for the customer;
   providing the customer with a credit card instrument issued by one of the program provided and the financing entity that can be drawn against the credit limit; and
   establishing monthly credit card payments in accordance with the balance drawn against the credit limit.

6. The method of claim 1, wherein the financing entity is affiliated with the program provider.

7. The method of claim 1, wherein the step of negotiating a discounted amount due for at least a portion of the outstanding debt owed to at least one creditor comprises obtaining a reduced interest rate for the debt.

8. The method of claim 1, wherein the step of negotiating a discounted amount due for at least a portion of the outstanding debt owed to at least one creditor comprises obtaining a waiver of late fees.

9. The method of claim 1, wherein the step of negotiating a discounted amount due for at least a portion of the outstanding debt owed to at least one creditor comprises obtaining a reduction in the debt.

10. The method of claim 1, wherein the step of negotiating a discounted amount due for at least a portion of the outstanding debt owed to at least one creditor comprises obtaining one or more of the following: a decrease in the interest rate for the debt, a waiver of late fees and obtaining a reduction in the debt.

11. A method for assisting a customer in recovering from indebtedness, the method comprising the steps of:
    identifying a customer, the customer having an outstanding debt owed to one or more creditors;
    enrolling the customer into a debt settlement program being provided by a program provider other than the one or more creditors;
    establishing a monthly payment for the customer to be made into an escrow account in lieu of payments to creditors for the outstanding debts;
    electronically creating the escrow account;
    requiring monthly payments from the customer into the escrow account for an initial period of time to detect customer reliability;
    qualifying the customer for a debt consolidation loan at an initial dollar amount after detecting a level of customer reliability as a result of the step of requiring payments from the customer into the escrow account, the debt consolidation loan being provided by a financing entity other than the one or more creditors;
    offering to the one or more creditors at least a portion of the debt consolidation loan as a discounted settlement of an outstanding debt owed;
    providing at least a portion of the discount to the customer;
    retaining a portion of the discount as compensation to at least one of the program provider and the financing entity;
    increasing the allocated amount of the debt consolidation loan by the remainder of the discount settlement; and
    providing the customer with a separate credit card instrument.

12. The method of claim 11, wherein the step of offering at least a portion of the debt consolidation loan as a discounted settlement of an outstanding debt owed to at least one of the creditors comprises obtaining a discount that includes one or more the following: a decrease in the interest rate for the debt, a waiver of late fees and obtaining a reduction in the debt.

13. A method for assisting a customer in recovering from indebtedness, the method comprising the steps of:
    identifying a customer, the customer having an outstanding debt owed to one or more creditors;
    enrolling the customer into a debt settlement program managed by a third party not affiliated with the one or more creditors;
    qualifying the customer for a debt consolidation loan at an initial dollar amount, the debt consolidation loan being provided by a financing entity, the debt consolidation loan contingent upon the customer making at least one payment into an escrow account associated with the debt consolidation loan;
    electronically creating the escrow account;
    receiving at least one payment from the customer into the escrow account;
    offering at least a portion of the debt consolidation loan to the one or more creditors as a discounted settlement of an outstanding debt owed to at least one creditor;
    retaining at least a portion of the value of the discount as compensation to the third party or the financing entity; and
    providing the customer with a separate credit card instrument which is issued by one of the financing entity and the third party.

14. The method of claim 13, wherein the step of qualifying the customer for a debt consolidation loan further comprises the steps of:
    establishing a monthly payment for the customer to be made in lieu of payments to creditors for the outstanding debts; and
    requiring monthly payments from the customer for an initial period of time to detect customer reliability.

15. The method of claim 14, wherein the step of offering at least a portion of the debt consolidation loan as a discounted settlement is performed after the expiration of the initial period of time.

16. The method of claim 14, wherein the step of offering at least a portion of the debt consolidation loan as a discounted settlement is performed after the expiration of the initial period of time and is managed by the third party.

17. The method of claim 14, wherein the step of qualifying the customer for a debt consolidation loan comprises approving the customer for a dollar amount that is based on the amount of the outstanding debt.

18. The method of claim 14, wherein the step of qualifying the customer for a debt consolidation loan comprises approving the customer for a dollar amount that is based on the amount of the outstanding debt and an expected discount amount.

19. The method of claim 13, wherein the step of retaining at least a portion of the value of the discount as compensation comprises the step of increasing the expended amount of the debt consolidation loan by the amount of the retained portion of the value.

20. The method of claim 13, wherein the step of offering at least a portion of the debt consolidation loan as a discounted settlement comprises obtaining a discount that includes one or more the following: a decrease in the interest rate for the debt, a waiver of late fees and obtaining a reduction in the debt.

\* \* \* \* \*